US006799319B2

(12) United States Patent
Van Loo (10) Patent No.: US 6,799,319 B2
(45) Date of Patent: Sep. 28, 2004

(54) METHOD AND APPARATUS FOR APPLICATION PACKAGES AND DELEGATE PACKAGES TO ADOPT AND EXPORT STANDARD EXECUTION STATE MACHINE INTERFACES

(75) Inventor: James T. Van Loo, Los Altos, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 562 days.

(21) Appl. No.: 09/907,532

(22) Filed: Jul. 16, 2001

(65) Prior Publication Data

US 2002/0049734 A1 Apr. 25, 2002

Related U.S. Application Data

(60) Provisional application No. 60/220,469, filed on Jul. 17, 2000.

(51) Int. Cl.[7] .................................................. G06F 9/44
(52) U.S. Cl. ....................................... 719/328; 719/318
(58) Field of Search ............................... 719/328, 318, 719/310, 315, 316

(56) References Cited

U.S. PATENT DOCUMENTS

| 4,852,157 | A | * | 7/1989 | Tyrrell | 379/236 |
|---|---|---|---|---|---|
| 5,721,920 | A | * | 2/1998 | Mak et al. | 718/102 |
| 5,959,968 | A | * | 9/1999 | Chin et al. | 370/216 |
| 6,138,171 | A | * | 10/2000 | Walker | 719/318 |
| 6,279,050 | B1 | * | 8/2001 | Chilton et al. | 710/20 |
| 6,298,061 | B1 | * | 10/2001 | Chin et al. | 370/400 |
| 6,317,638 | B1 | * | 11/2001 | Schreder et al. | 700/79 |
| 6,430,740 | B1 | * | 8/2002 | Hart et al. | 717/108 |
| 2002/0174207 | A1 | * | 11/2002 | Battou | 709/223 |
| 2003/0191797 | A1 | * | 10/2003 | Gurevich et al. | 709/200 |

FOREIGN PATENT DOCUMENTS

WO  WO 98/26348  6/1998  ............. G06F/7/00

OTHER PUBLICATIONS

Hamilton, James et al. "A Generic Multi–node State Monioring Subsystem." Computing in High Energy and Nuclear Physics. Mar. 2003.*
Yu, Shwu–Hwa S. et al., "An Improved Method for Automatic Validation of Communication Protocols." IEEE. 1990.*
Shapiro, Jonathan et al. "Topology Discovery Service for Router–Assisted Multicast Transport." Jun. 14, 2002.*
"Package to JAVA.TV.XLET", JAVA TV API 1.0 Release Candidate D, http://web.archive.org/web/20000815091055/java.sun.com/products/javatv/, Apr. 6, 2000, XP 002202368.
"JAVA TV API Sepcification Draft 0.90", Sun Microsystems, Jun. 14, 1999, XP 002143725, Chapter 7, Application Lifestyle.
European Search Report from corresponding PCT application.

* cited by examiner

Primary Examiner—Lewis A. Bullock, Jr.
(74) Attorney, Agent, or Firm—Beyer Weaver & Thomas, LLP (57) ABSTRACT

A cascadable state machine that observes the execution state machine of multiple client applications, aggregates the multiple execution states into a single execution state for the observation object, reports the aggregate execution state through the same execution state machine interface as the client applications, and cascades changes to the execution state machine of the observation object to the client applications.

18 Claims, 10 Drawing Sheets

Table 1

|   | L | P | R | D |
|---|---|---|---|---|
| L | x | P | x | D |
| P | x | x | R | D |
| R | x | P | x | D |
| D | x | x | x | x |

Fig. 6

Table 2

|    | LL | LP | LR | LD | PP | PR | PD | RR | RD | DD |
|----|----|----|----|----|----|----|----|----|----|----|
| LL | x  | P  | x  | (L)| x  | x  | x  | x  | x  | x  |
| LP | x  | x  | R  | (P)| (P)| x  | (P)| x  | x  | x  |
| LR | x  | P  | x  | P  | x  | (R)| x  | (R)| x  | x  |
| LD | x  | x  | x  | x  | x  | x  | P  | x  | x  | D  |
| PP | x  | x  | x  | x  | x  | R  | (P)| x  | x  | x  |
| PR | x  | x  | x  | x  | P  | x  | P  | (R)| (R)| x  |
| PD | x  | x  | x  | x  | x  | x  | x  | x  | R  | D  |
| RR | x  | x  | x  | x  | x  | (R)| x  | x  | (R)| x  |
| RD | x  | x  | x  | x  | x  | x  | P  | x  | x  | D  |
| DD | x  | x  | x  | x  | x  | x  | x  | x  | x  | x  |

Fig. 7

Table 3

| | LLL | LLP | LLR | LLD | LPP | LPR | LPD | LRR | LRD | LDD |
|---|---|---|---|---|---|---|---|---|---|---|
| LLL | x | P | x | (L) | x | x | x | x | x | x |
| LLP | x | x | R | (P) | (P) | x | (P) | x | x | x |
| LLR | x | P | x | (P) | x | (R) | x | x | (R) | x |
| LLD | x | x | x | x | x | x | P | x | x | (L) |
| LPP | x | x | x | x | x | R | (P) | x | x | x |
| LPR | x | x | x | x | P | x | P | (R) | (R) | x |
| LPD | x | x | x | x | x | x | x | x | R | (P) |
| LRR | x | x | x | x | x | (R) | x | x | (R) | x |
| LRD | x | x | x | x | x | x | P | x | x | P |
| LDD | x | x | x | x | x | x | x | x | x | x |
| PPP | x | x | x | x | x | x | x | x | x | x |
| PPR | x | x | x | x | x | x | x | x | x | x |
| PPD | x | x | x | x | x | x | x | x | x | x |
| PRR | x | x | x | x | x | x | x | x | x | x |
| PRD | x | x | x | x | x | x | x | x | x | x |
| PDD | x | x | x | x | x | x | x | x | x | x |
| RRR | x | x | x | x | x | x | x | x | x | x |
| RRD | x | x | x | x | x | x | x | x | x | x |
| RDD | x | x | x | x | x | x | x | x | x | x |
| DDD | x | x | x | x | x | x | x | x | x | x |

| | PPP | PPR | PPD | PRR | PRD | PDD | RRR | RRD | RDD | DDD |
|---|---|---|---|---|---|---|---|---|---|---|
| LLL | x | x | x | x | x | x | x | x | x | x |
| LLP | x | x | x | x | x | x | x | x | x | x |
| LLR | x | x | x | x | x | x | x | x | x | x |
| LLD | x | x | x | x | x | x | x | x | x | x |
| LPP | (P) | x | (P) | x | x | x | x | x | x | x |
| LPR | x | (R) | x | x | (R) | x | x | x | x | x |
| LPD | x | x | (P) | x | x | (P) | x | x | x | x |
| LRR | x | x | x | (R) | x | x | x | (R) | x | x |
| LRD | x | x | x | x | (R) | x | x | x | (R) | x |
| LDD | x | x | x | x | x | P | x | x | x | D |
| PPP | x | R | (P) | x | x | x | x | x | x | x |
| PPR | x | x | P | (R) | (R) | x | x | x | x | x |
| PPD | x | x | x | x | R | (P) | x | x | x | x |
| PRR | x | (R) | x | x | (R) | x | (R) | x | x | x |
| PRD | x | x | P | x | x | P | x | (R) | (R) | x |
| PDD | x | x | x | x | x | x | x | x | R | D |
| RRR | x | x | x | (R) | x | x | x | (R) | x | x |
| RRD | x | x | x | x | (R) | x | x | x | (R) | x |
| RDD | x | x | x | x | x | P | x | x | x | D |
| DDD | x | x | x | x | x | x | x | x | x | x |

METHOD AND APPARATUS FOR APPLICATION PACKAGES AND DELEGATE PACKAGES TO ADOPT AND EXPORT STANDARD EXECUTION STATE MACHINE INTERFACES

CROSS REFERENCE TO RELATED APPLICATION

This application takes priority under U.S.C. 119(e) of U.S. Provisional Application No. 60/220,469 filed Jul. 17, 2000 entitled, "METHOD AND APPARATUS FOR APPLICATION PACKAGES AND DELEGATE PACKAGES TO ADOPT AND EXPORT STANDARD EXECUTION STATE MACHINE INTERFACES" by van Loo which is incorporated by reference in its entirety.

BACKGROUND OF THE INVENTION

1. Field of Invention

This invention relates generally to applications that are declarative (passive) content, executable (active) content, or some combination of declarative and executable content. Specifically, a cascadable state machine for broadcast content that includes a collection of rules for how content objects that control other pieces of content would reflect their execution states is disclosed.

2. Description of Related Art

It is common to associate an execution state machine with both declarative (passive) content and executable (active) content. The concept applies to both broadcast content, interactive content, and Internet content. In the context of downloadable interoperable content, such as Java Byte Code, the javax.tv.xlet.Xlet interface provides the execution state machine for broadcast content while the java.applet.Applet class provides the execution state machine for Internet content. The state machines let the platform (as well as remote objects) observe and control the progress of content execution and understand its implications on resource allocation. The current practice is for a single piece of content to delegate either to standard (perhaps interoperable) platform packages or to download (perhaps interoperable) content specific packages that in turn delegate to platform packages.

Unfortunately, however, if the content delegates to a downloadable package to realize itself, it is difficult for the platform (or perhaps remote objects) to observe and control the delegate packages. It is also not obvious to the platform which content relates to which delegate packages, nor is it obvious whether the control (such as the deletion) of specific pieces of content affects the delegate package. It is also not clear to the platform whether the control (such as the deletion) of a delegate package affects specific pieces of content.

Therefore what is desired is a cascadable state machine for broadcast content.

SUMMARY OF THE INVENTION

According to the present invention, methods, apparatus, and systems are disclosed for providing a cascadable state machine for broadcast content is disclosed.

In one embodiment, a cascadable state machine that observes the execution state machine of multiple client applications, aggregates the multiple execution states into a single execution state for the observation object, reports the aggregate execution state through the same execution state machine interface as the client applications, and cascades changes to the execution state machine of the observation object to the client applications.

In another embodiment, a method for providing a cascadable state machine is disclosed that includes observing an execution state machine associated with a plurality of multiple client applications each having an associated execution state, aggregating the associated execution states into a single aggregated execution state suitable for an observation object, reporting the single aggregated execution state through the same execution state machine interface as the client applications, and cascading a change to the execution state machine of the observation object to the client applications.

In yet another embodiment, computer program product executable on a computing system arranged to provide a cascadable state machine in a computing system is disclosed that includes computer code for observing an execution state machine associated with a plurality of multiple client applications each having an associated execution state. Also included are computer code for aggregating the associated execution states into a single aggregated execution state suitable for an observation object, computer code for reporting the single aggregated execution state through the same execution state machine interface as the client applications, computer code for cascading a change to the execution state machine of the observation object to the client applications, and computer readable medium for storing the computer program product.

BRIEF DESCRIPTION OF THE DRAWINGS

The invention will be better understood by reference to the following description taken in conjunction with the accompanying drawings.

DETAILED DESCRIPTION OF SELECTED EMBODIMENTS

Reference will now be made in detail to a preferred embodiment of the invention. An example of the preferred embodiment is illustrated in the accompanying drawings. While the invention will be described in conjunction with a preferred embodiment, it will be understood that it is not intended to limit the invention to one preferred embodiment. To the contrary, it is intended to cover alternatives, modifications, and equivalents as may be included within the spirit and scope of the invention as defined by the appended claims.

In one embodiment, a cascadable state machine that observes the execution state machine of multiple client applications, aggregates the multiple execution states into a single execution state for the observation object, reports the aggregate execution state through the same execution state machine interface as the client applications, and cascades changes to the execution state machine of the observation object to the client applications.

Figure 1:
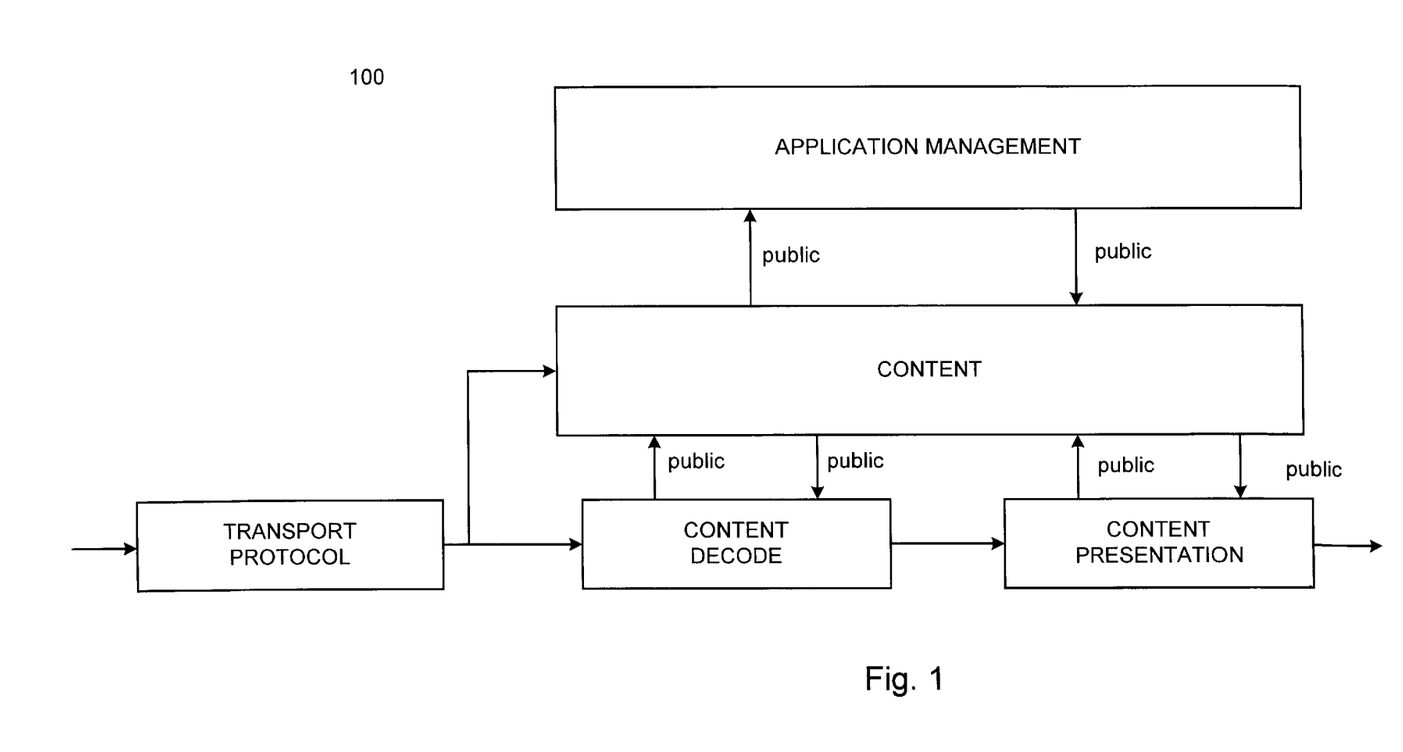
FIG. 1 illustrates a platform that receives an application that has both declarative (passive) content and executable (active) content.

FIG. 1 illustrates a platform 100 that receives an application that has both declarative (passive) content and executable (active) content. The declarative content might encode documents, for example, while the executable content might encode downloadable software such as the Java Byte Code. The premise is that both the application and the platform conform to interoperable interfaces. The application adopts a standard, interoperable execution state machine and exports a standard, interoperable interface through which the platform can observe and control the execution states. The platform through the application manager also adopts the standard, interoperable execution state machine and exports a standard, interoperable interface through which the application can report its execution state.

Figure 2A:
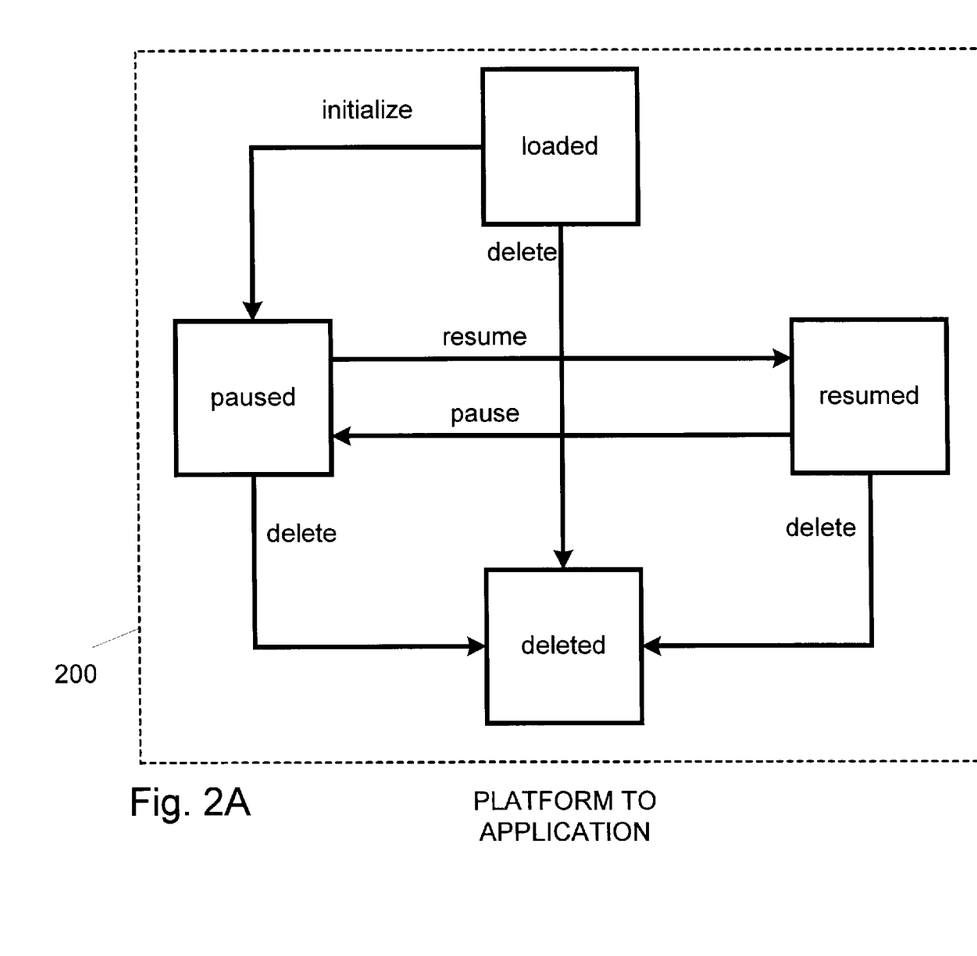
FIGS. 2A and 2B show an execution state machine for broadcast content that executes on interoperable platforms.
Figure 2B:
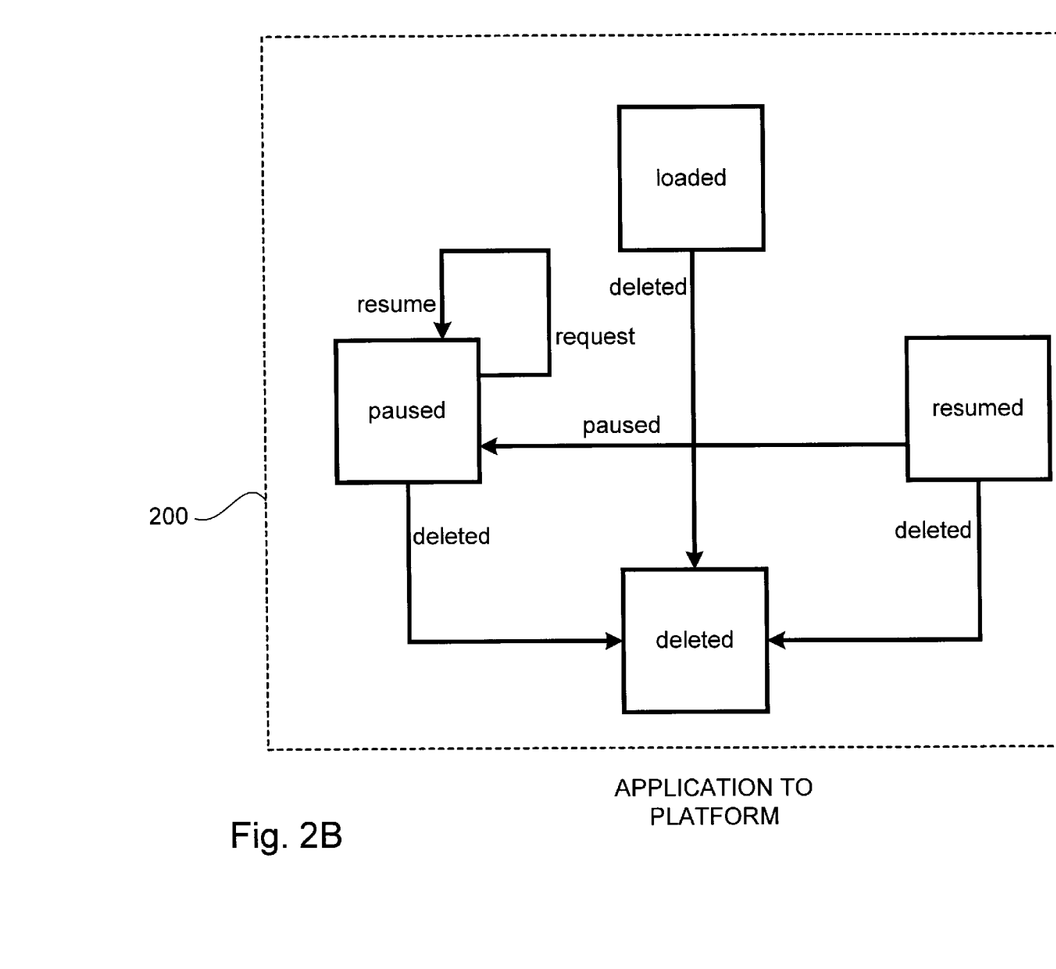

An execution state machine 200 for broadcast content that executes on interoperable platforms is shown in FIGS. 2A and 2B. The execution state machine 200 consists of four states, i.e., loaded (L), paused (P), deleted (D), and resumed (R). FIG. 2A illustrates the operations that the platform can perform on the application. The application exports a standard interface through which the platform causes execution state transitions. FIG. 2B illustrates the operations that the application can perform on the platform. The platform exports a standard interface through which the application reports execution state transitions.

The role of the executable content is to parse and render the declarative content. The platform exports standard, interoperable interfaces to which the application can delegate these operations. The executable content consumes both broadcast bandwidth and platform footprint.

Figure 3:
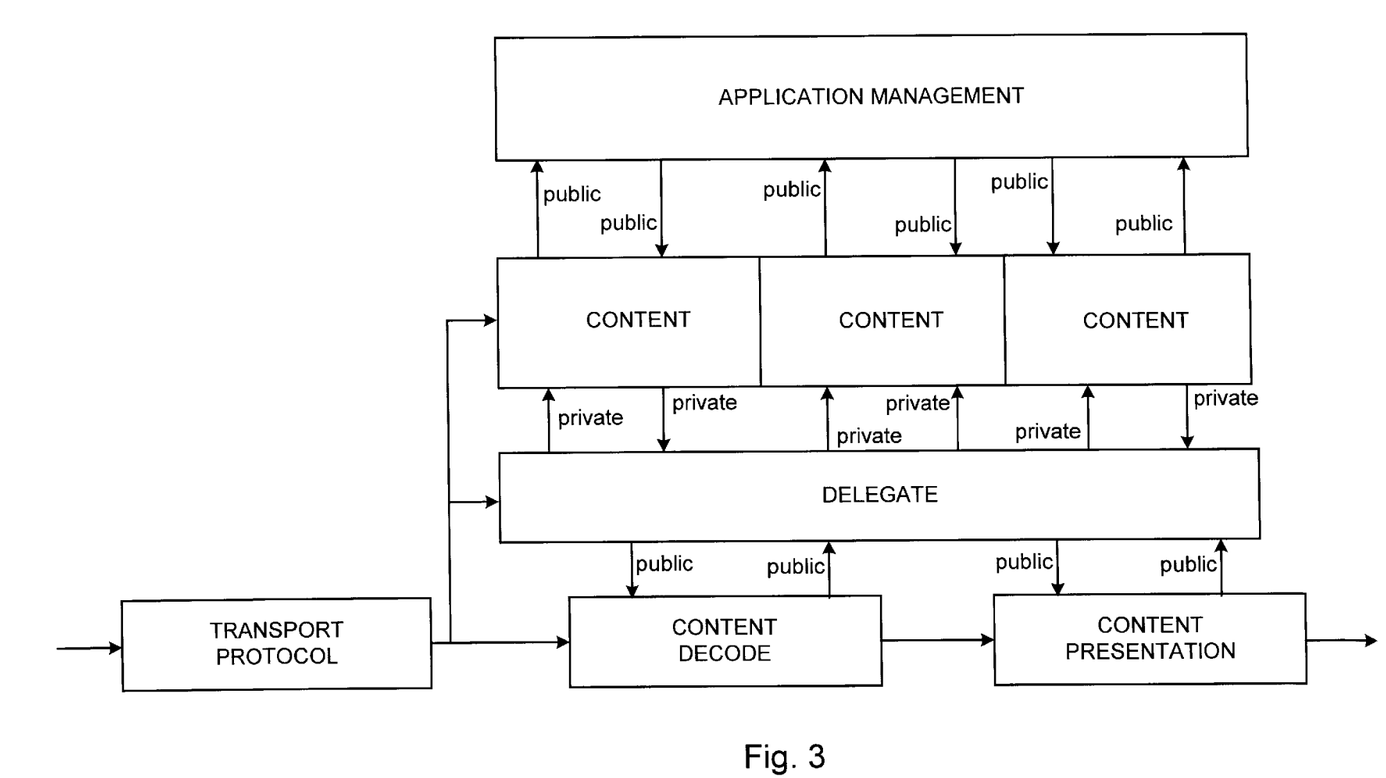
FIG. 3 illustrates an additional architecture in accordance with an embodiment of the invention.

FIG. 3 illustrates an additional architecture 300 in accordance with an embodiment of the invention. The architecture 300 amortizes the executable content across the declarative content of multiple applications. Since the platform must manage the content, the applications also include just enough executable content to implement the execution state machine. In FIG. 3, three applications export the standard, interoperable execution state machine interface, but delegate execution intensive operations to a common collection of downloadable packages. The advantage is that the platform provides resident packages to support a small (perhaps zero) collection of pervasive content formats, but the cooperative applications can share downloadable packages for obscure content formats.

Figure 4:
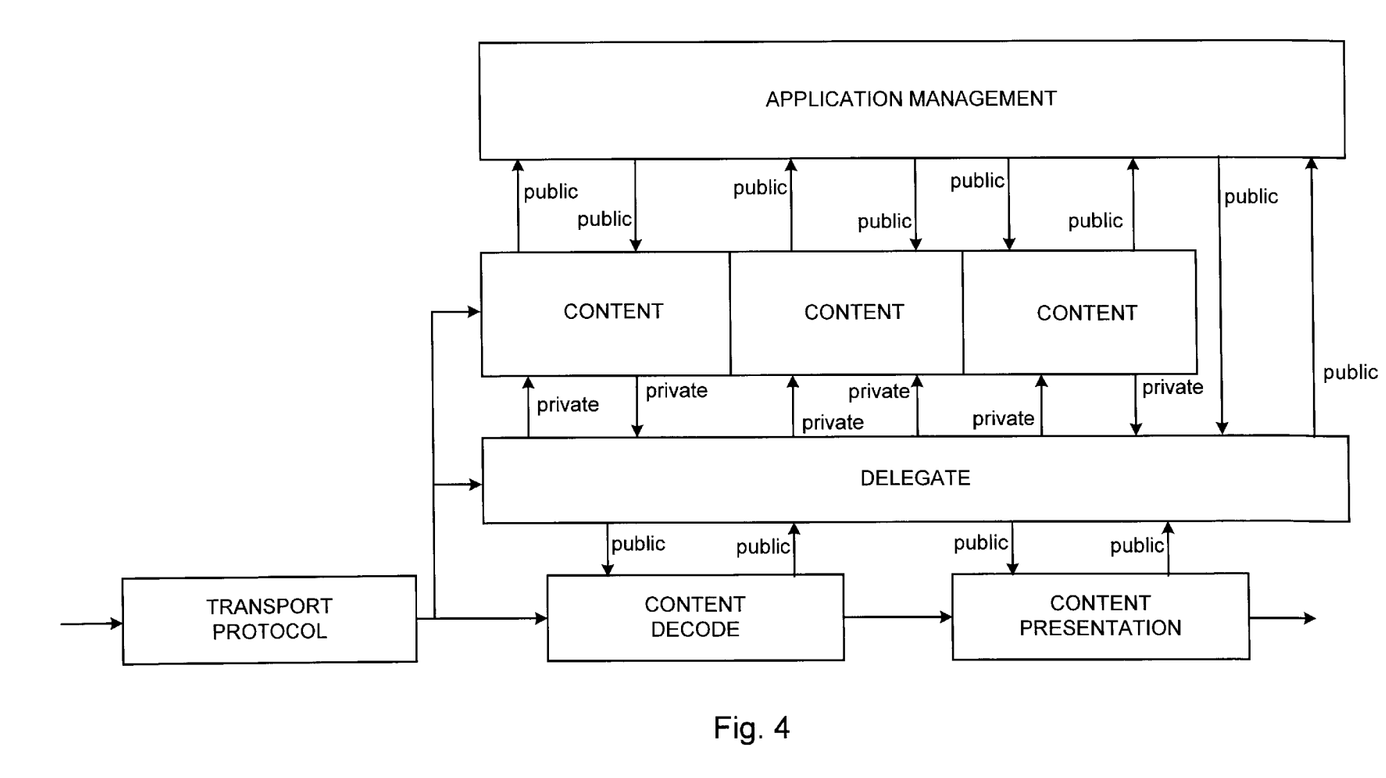
FIG. 4 illustrates the situation where the application packages and the delegate packages both adopt the standard execution state machine and for the application packages and delegate packages to both export the standard execution state machine interfaces in accordance with an embodiment of the invention.

FIG. 4 illustrates the situation where the application packages and the delegate packages both adopt the standard execution state machine and for the application packages and delegate packages to both export the standard execution state machine interfaces in accordance with an embodiment of the invention. The applications consist of declarative content plus just enough executable content to interact with the platform and the delegate. The applications export the standard execution interface to the platform, but these applications also report execution state transitions to the delegate package.

The delegate package exports the standard execution interface to the platform, but the delegate package also observes execution state transitions of the client applications. The delegate package reflects the execution state transitions of its clients into its execution state machine. The companion piece of the design is that the delegate package creates the objects that implement the execution state machine of the clients for the platform. The design provides precise rules about the interaction of the client execution states versus delegate execution states. The implication is that the platform can understand at all times the relationship between client execution transitions versus delegate execution transitions.

Figure 5:
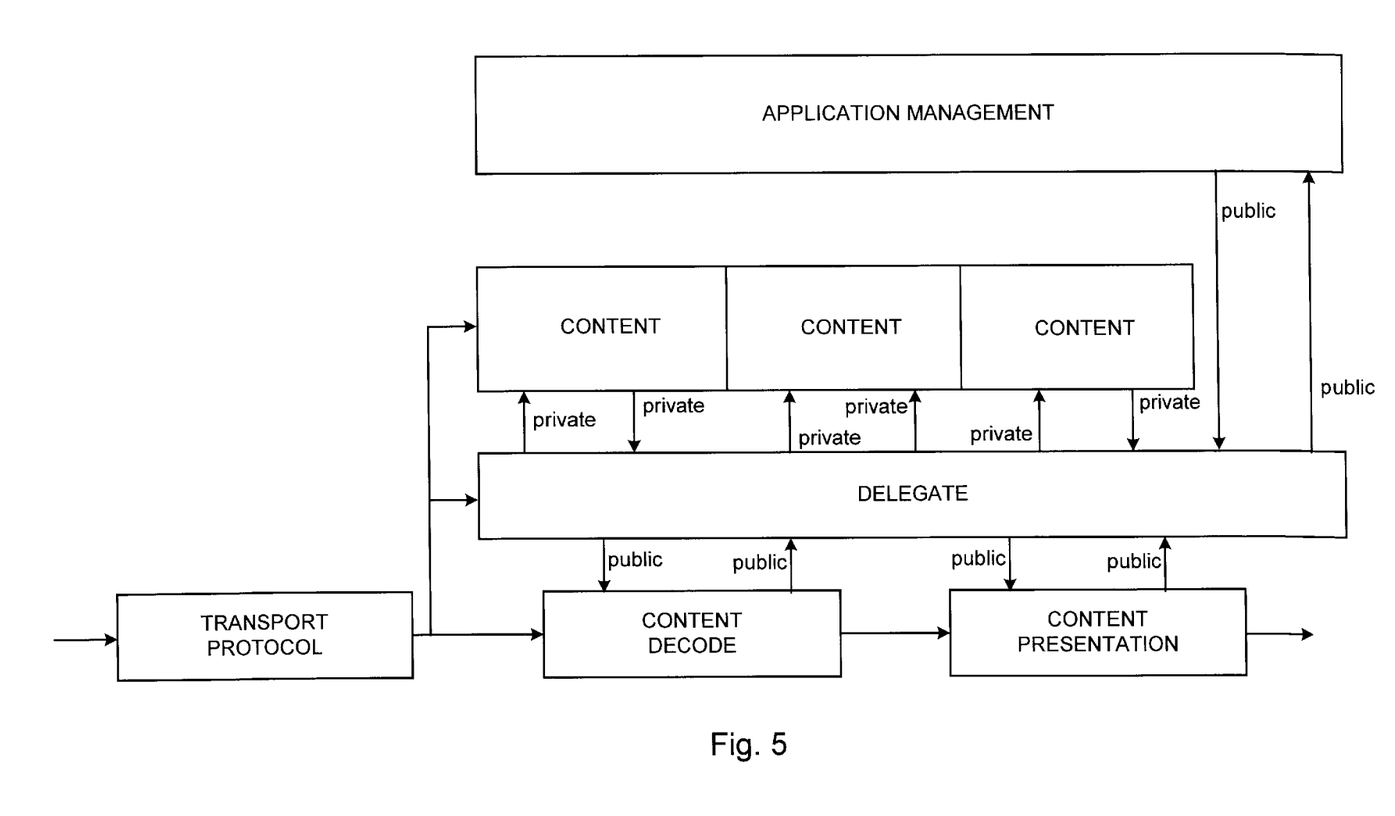
FIG. 5 illustrates a variation on the architecture in which the applications export the standard interface for the execution state machine, but export the interface to the delegate rather than the platform.

FIG. 5 illustrates a variation on the architecture in which the applications export the standard interface for the execution state machine, but export the interface to the delegate rather than the platform. The delegate in turn exports the standard interface through which the applications report execution state transitions. The platform and the delegate still interact through the standard interfaces. The implication is that the platform assigns application management of certain applications to the delegate itself.

The observation motivates a subtle but important feature of the design, i.e., both the application and the delegate adopt the same execution state machine and adopt standard interfaces to observe and control the execution states. The implication is that the platform can reason about the content as a consistent abstraction, independent of whether the application elects to present itself as a single combination of declarative content and executable content, or elects to make explicit the division between declarative content versus executable content.

The observation of the previous section is that the cascadable content state machine architecture does not require separate execution state machines for application packages versus delegate packages. The elegance of the architecture is that these components can share a single execution state machine. Since the delegate aggregates the client execution states, the architecture requires precise rules for the propagation of execution states.

Figure 6:
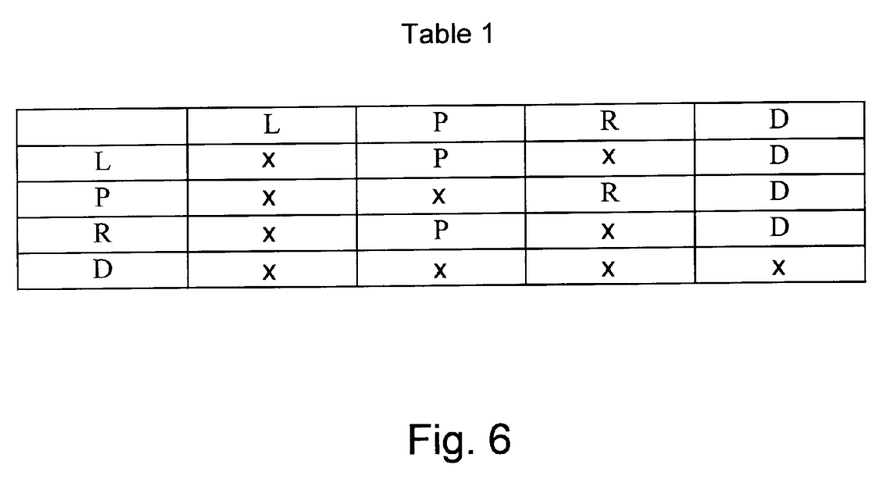
FIG. 6 shows a Table 1 that characterizes the situation where the delegate supports a single client application, or delegate supports multiple client applications that exhibit one execution state.

FIG. 6 shows a Table 1 that characterizes the situation where the delegate supports a single client application, or delegate supports multiple client applications that exhibit one execution state. The table rows encode the execution state before a state transition while the table columns encode the execution state after a state transition. It should be noted that the table cells with a character represent feasible client state transitions. The character encodes the state that the delegate reports after the client state transition. The table cells with an "x" represent invalid state transitions. The delegate observes the client state transitions either through private (content specific) interface or through the standard interface for the execution state machine. The delegate state machine just shadows the client state machine.

Figure 7:
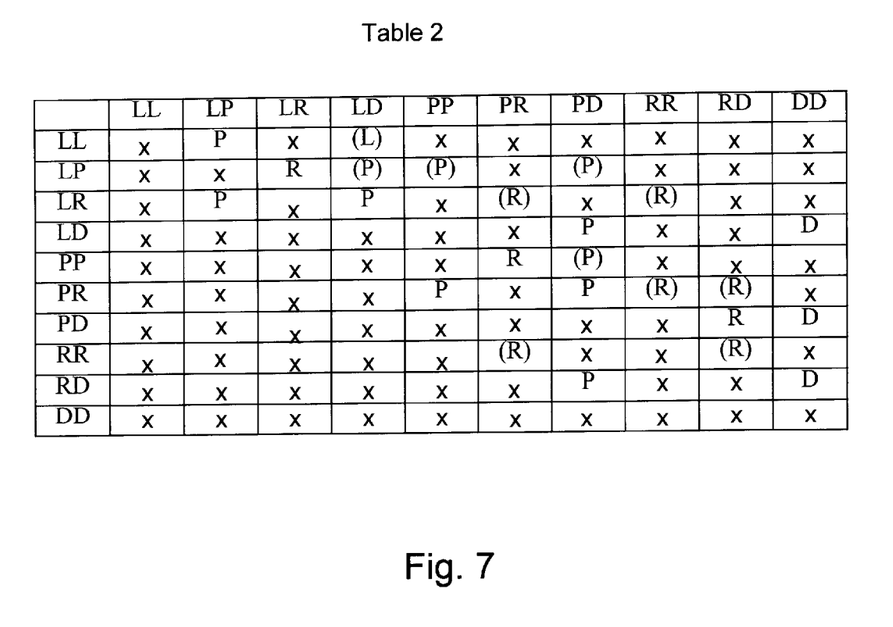
FIG. 7 shows a Table 2 that corresponds to the situation where the delegate supports two client applications, or the delegate supports multiple client applications that exhibit at most two execution states.

FIG. 7 shows a Table 2 that corresponds to the situation where the delegate supports two client applications, or the delegate supports multiple client applications that exhibit at most two execution states.

The table cells with a character represent feasible client state transitions. The character encodes the state that the delegate reports after the client state transition. The table cells with a character surrounded with parenthesis represent feasible client state transitions that do not cause a delegate state transition. The character encodes the delegate state before and after the client state transition. The table cells with "x" represent invalid client state transitions.

Figure 8:
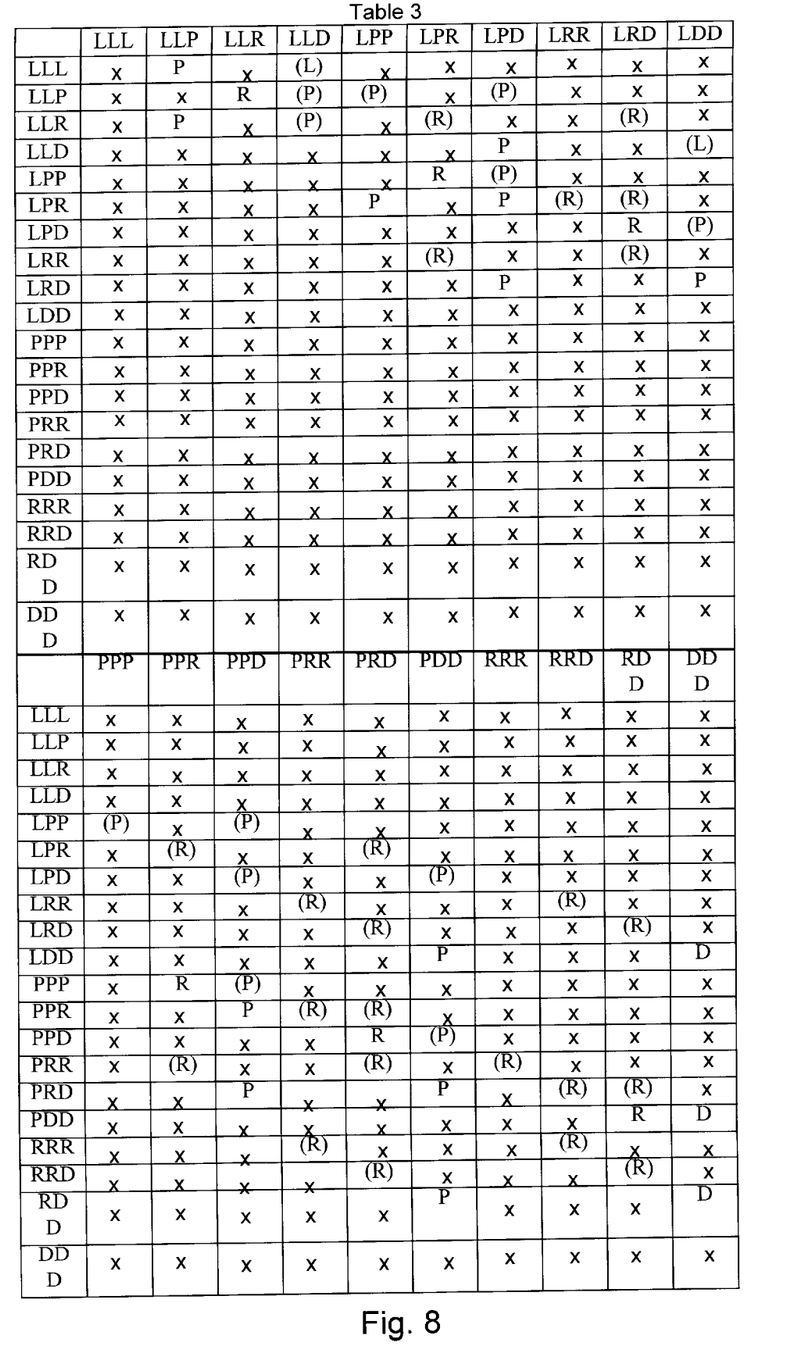
FIG. 8 shows a Table 3 that corresponds to the situation where the delegate supports three client applications, or the delegate supports multiple client applications that exhibit three execution states.

FIG. 8 shows a Table 3 that corresponds to the situation where the delegate supports three client applications, or the delegate supports multiple client applications that exhibit three execution states.

The table cells with a character represent feasible client state transitions. The character encodes the state that the delegate reports after the client state transition. The table cells with a character surrounded with parenthesis represent feasible client state transitions that do not cause a delegate state transition. The character encodes the delegate state before and after the client state transition. The table cells with "x" represent invalid client state transitions.

One implementation of the logic would be a dispatch table. The implementation would encode the client state before the transition plus client state after the transition into an index into the dispatch table. The implementation then executes code specific to the client state transition. For example, if the client transition is valid but does not cause the delegate state to change, the code just replaces the client state before the transition with the client state after the transition and returns to the client. If the client transition is valid and should cause the delegate state to change, the delegate reports (or requests) the transition through its standard interface. If the operation returns without exception, the delegate code returns to the client without an exception. If the operation returns an exception, the delegate code perhaps cascades the exception to the client. If the client transition is not valid, the delegate code returns an exception to the client or should the standard signature not provide an exception, ignore the client transition.

Therefore, the invention provides an apparatus that observes the execution state machine of multiple client applications, aggregates the multiple execution states into a single execution state for the observation object, reports the aggregate execution state through the same execution state machine interface as the client applications, and cascades changes to the execution state machine of the observation object to the client applications.

Figure 9:
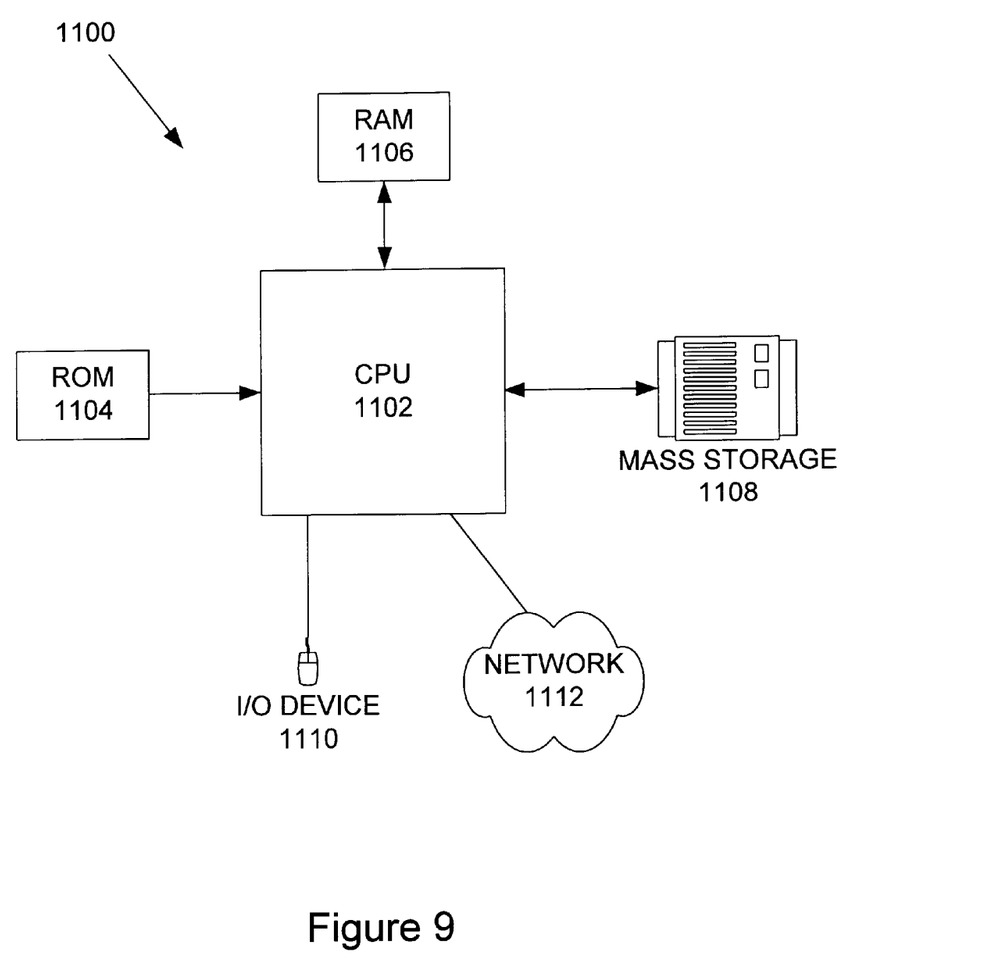
FIG. 9 illustrates a computer system employed to implement the invention.

FIG. 9 illustrates a computer system 1100 employed to implement the invention. The computer system 1100 or, more specifically, CPUs 1102, may be arranged to support a virtual machine, as will be appreciated by those skilled in the art. As is well known in the art, ROM acts to transfer data and instructions uni-directionally to the CPUs 1102, while RAM is used typically to transfer data and instructions in a bi-directional manner. CPUs 1102 may generally include any number of processors. Both primary storage devices 1104, 1106 may include any suitable computer-readable media. A secondary storage medium 1108, which is typically a mass memory device, is also coupled bi-directionally to CPUs 1102 and provides additional data storage capacity. The mass memory device 1108 is a computer-readable medium that may be used to store programs including computer code, data, and the like. Typically, mass memory device 1108 is a storage medium such as a hard disk or a tape which generally slower than primary storage devices 1104, 1106. Mass memory storage device 1108 may take the form of a magnetic or paper tape reader or some other well-known device. It will be appreciated that the information retained within the mass memory device 1108, may, in appropriate cases, be incorporated in standard fashion as part of RAM 1106 as virtual memory. A specific primary storage device 1104 such as a CD-ROM may also pass data uni-directionally to the CPUs 1102.

CPUs 1102 are also coupled to one or more input/output devices 1110 that may include, but are not limited to, devices such as video monitors, track balls, mice, keyboards, microphones, touch-sensitive displays, transducer card readers, magnetic or paper tape readers, tablets, styluses, voice or handwriting recognizers, or other well-known input devices such as, of course, other computers. Finally, CPUs 1102 optionally may be coupled to a computer or telecommunications network, e.g., an Internet network or an intranet network, using a network connection as shown generally at 1112. With such a network connection, it is contemplated that the CPUs 1102 might receive information from the network, or might output information to the network in the course of performing the above-described method steps. Such information, which is often represented as a sequence of instructions to be executed using CPUs 1102, may be received from and outputted to the network, for example, in the form of a computer data signal embodied in a carrier wave. The above-described devices and materials will be familiar to those of skill in the computer hardware and software arts.

Although only a few embodiments of the present invention have been described, it should be understood that the present invention may be embodied in many other specific forms without departing from the spirit or the scope of the present invention. By way of example, the multi-platform compiler can be used in any computing system.

Although the apparatus and methods for application packages and delegate packages to adopt and export standard execution state machine interfaces in accordance with the present invention are particularly suitable for implementation with respect to a Java™ based environment, the methods may generally be applied in any suitable object-based environment. In particular, the methods are suitable for use in platform-independent object-based environments. It should be appreciated that the methods may also be implemented in some distributed object-oriented systems.

While the present invention has been described as being used with a distributed object based computer system, it should be appreciated that the present invention may generally be implemented on any suitable computing system having a compiler. Therefore, the present examples are to be considered as illustrative and not restrictive, and the invention is not to be limited to the details given herein, but may be modified within the scope of the appended claims along with their full scope of equivalents.

While this invention has been described in terms of a preferred embodiment, there are alterations, permutations, and equivalents that fall within the scope of this invention. It should also be noted that there are may alternative ways of implementing both the process and apparatus of the present invention. It is therefore intended that the invention be interpreted as including all such alterations, permutations, and equivalents as fall within the true spirit and scope of the present invention.

What is claimed is:

1. A method of providing a cascadable state machine in a computing system, comprising:

observing an execution state machine associated with a plurality of multiple client applications each having an associated execution state;

aggregating the associated execution states into a single aggregated execution state suitable for an observation object;

reporting the single aggregated execution state through an execution state machine interface associated with the client applications; and cascading a change to the execution state machine of the observation object to the client applications.

2. A method as recited in claim 1, wherein the state machine is suitable for broadcast content.

3. A method as recited in claim 2, further comprising:

executing on an interoperable platform.

4. A method as recited in claim 3, wherein the executable state machine is formed of four states.

5. A method as recited in claim 4, wherein the four states includes a loaded state, a paused state, a deleted state, and a resumed state.

6. A method as recited in claim 5, further comprising exporting a standard interface through which the client application reports an execution state transition by the interoperable platform.

7. In a computing system, a cascadable state machine comprising:

means for observing an execution state machine associated with a plurality of multiple client applications each having an associated execution state;

means for aggregating the associated execution states into a single aggregated execution state suitable for an observation object;

means for reporting the single aggregated execution state through the same execution state machine interface as the client applications; and means for cascading a change to the execution state machine of the observation object to the client applications.

8. A state machine as recited in claim 7, wherein the state machine is suitable for broadcast content.

9. A state machine as recited in claim 8, further comprising:

means for executing on an interoperable platform.

10. A state machine as recited in claim 9, wherein the executable state machine is formed of four states.

11. A state machine as recited in claim 10, wherein the four states includes a loaded state, a paused state, a deleted state, and a resumed state.

12. A state machine as recited in claim 11, wherein the interoerable platform exports a standard interface through which the client application reports an execution state transition.

13. Computer program product executable on a computing system arranged to provide a cascadable state machine in a computing system, comprising:

computer code for observing an execution state machine associated with a plurality of multiple client applications each having an associated execution state;

computer code for aggregating the associated execution states into a single aggregated execution state suitable for an observation object;

computer code for reporting the single aggregated execution state through the same execution state machine interface as the client applications;

computer code for cascading a change to the execution state machine of the observation object to the client applications; and computer readable medium for storing the computer program product.

14. A computer program product as recited in claim 13, wherein the state machine is suitable for broadcast content.

15. A computer program product as recited in claim 14, further comprising:

computer code for executing on an interoperable platform by the state machine.

16. A computer program product as recited in claim 15, wherein the executable state machine is formed of four states.

17. A computer program product as recited in claim 16, wherein the four states includes a loaded state, a paused state, a deleted state, and a resumed state.

18. A computer program product as recited in claim 17, further comprising computer code for exporting a standard interface through which the client application reports an execution state transition by the interoperable platform.

* * * * *